US 6,710,982 B2

(12) United States Patent
Mack et al.

(10) Patent No.: US 6,710,982 B2
(45) Date of Patent: Mar. 23, 2004

(54) DOMAIN CONTROL IN SHIELDS OF A MAGNETIC TRANSDUCER

(75) Inventors: Anthony M. Mack, Minneapolis, MN (US); Ladislav R. Pust, Savage, MN (US); Christopher J. Rea, Eden Prairie, MN (US); Sunita Gangopadhyay, Chanhassen, MN (US); Patrick J. Ryan, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/886,601

(22) Filed: Jun. 21, 2001

(65) Prior Publication Data

US 2002/0008945 A1 Jan. 24, 2002

Related U.S. Application Data

(60) Provisional application No. 60/218,267, filed on Jul. 13, 2000.

(51) Int. Cl.⁷ ................................................ G11B 5/127
(52) U.S. Cl. ........................................................ 360/319
(58) Field of Search ........................................ 360/319

(56) References Cited

U.S. PATENT DOCUMENTS

| | | | | |
|---|---|---|---|---|
| 4,750,072 A | * | 6/1988 | Takagi | 360/126 |
| 4,843,506 A | | 6/1989 | Gill et al. | 360/113 |
| 5,018,037 A | | 5/1991 | Krounbi et al. | 360/113 |
| 5,208,715 A | | 5/1993 | Mowry | 360/113 |
| 5,287,237 A | | 2/1994 | Kitada et al. | 360/113 |
| 5,515,221 A | | 5/1996 | Gill et al. | 360/113 |
| 5,559,653 A | | 9/1996 | Shouji et al. | 360/126 |
| 5,621,592 A | | 4/1997 | Gill et al. | 360/113 |
| 5,739,991 A | | 4/1998 | Matono et al. | 360/113 |
| 5,838,521 A | * | 11/1998 | Ravipati | 360/319 |
| 6,018,443 A | | 1/2000 | Watanabe et al. | 360/113 |
| 6,222,702 B1 | * | 4/2001 | Macken et al. | 360/128 |

FOREIGN PATENT DOCUMENTS

| | | |
|---|---|---|
| EP | 61196419 | 8/1986 |
| EP | 03219410 | 9/1991 |
| EP | 328615 | 11/1999 |

OTHER PUBLICATIONS

Journal of Applied Physics, "Simulation of domain structure for magnetic thin film in an applied field," vol. 68, No. 1, Jul. 1, 1990, pp. 263–268.

* cited by examiner

Primary Examiner—David Davis
(74) Attorney, Agent, or Firm—Westman, Champlin & Kelly

(57) ABSTRACT

A read/write head includes a bottom shield and a shared shield. The shared shield includes a first domain and a plurality of closure domains. The read/write head also includes a magnetoresistive sensor deposited adjacent an air bearing surface between the bottom shield and the shared shield. The magnetoresistive sensor includes a magnetoresistor aligned with the first domain. Non-magnetic material separates the magnetoresistive sensor from the bottom shield and the shared shield. The shared shield includes a shaped feature that defines an unambiguous direction of magnetization for the first domain.

17 Claims, 6 Drawing Sheets

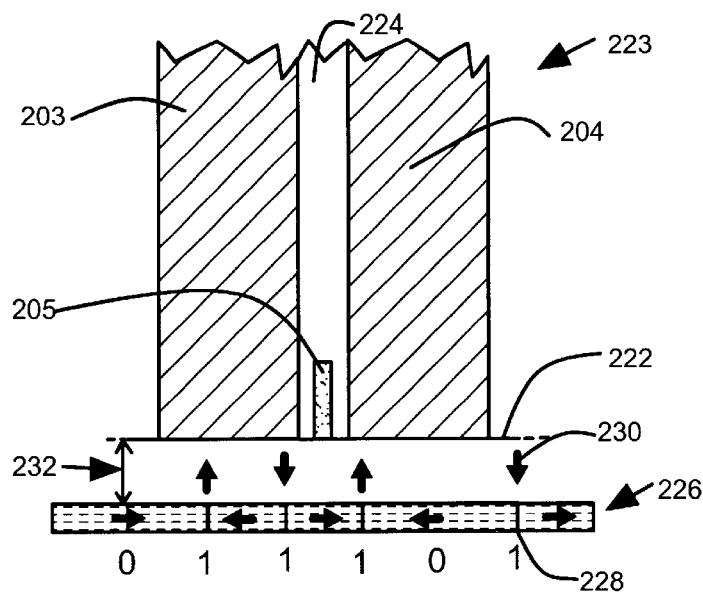
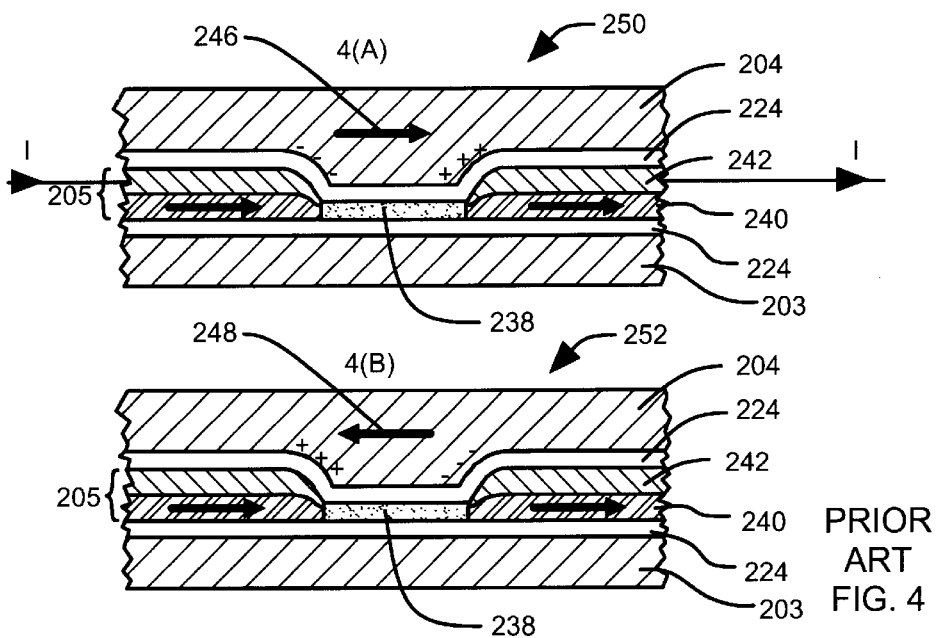
FIG. 3
PRIOR ART
FIG. 4

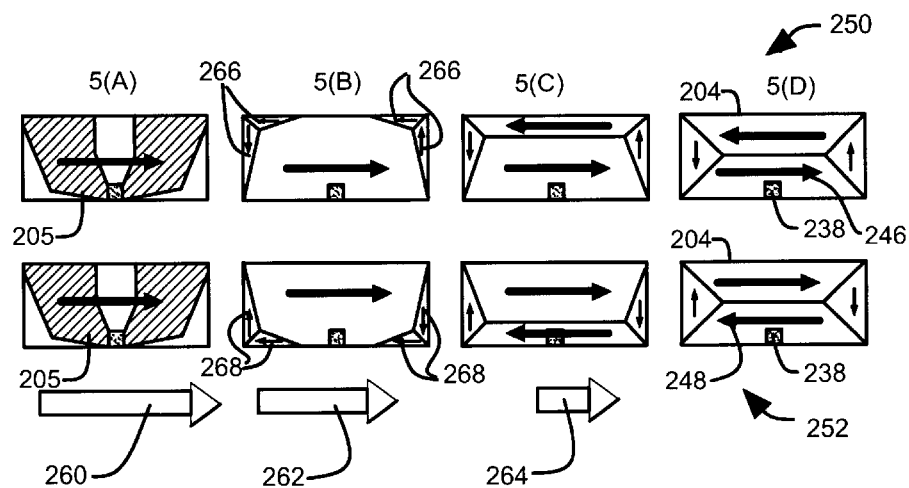
PRIOR ART  FIG. 5
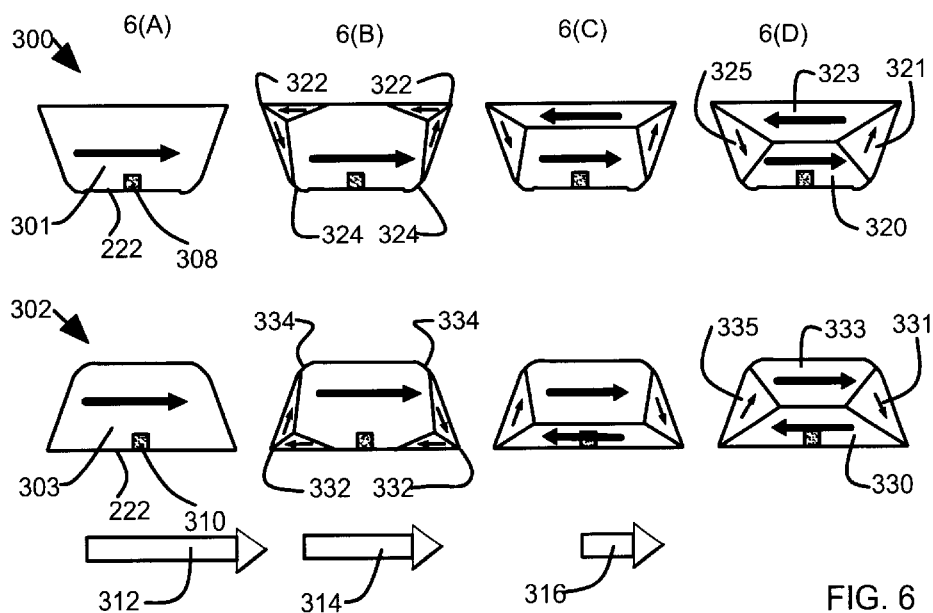
FIG. 6

DOMAIN CONTROL IN SHIELDS OF A MAGNETIC TRANSDUCER

CROSS-REFERENCE TO RELATED APPLICATION

This application claims priority benefits from U.S. Provisional Application 60/218,267 titled "Domain Control in Shields of Magnetic Transducer," filed Jul. 13, 2000.

FIELD OF THE INVENTION

The present invention relates generally to heads for use in a magnetic storage drive. In particular, this invention relates to methods and apparatus for magnetizing shields in such heads.

BACKGROUND OF THE INVENTION

A read/write head in a disc drive typically includes a magnetoresistive (MR) read transducer that is deposited between non-magnetic layers and magnetic shield layers. The magnetoresistive read transducer typically includes a magnetoresistor, electrical contacts and one or more bias magnets that magnetically bias the magnetoresistor, as taught in U.S. Pat. No. 5,018,037 Krounbi et al., for example. Various magnetic biasing arrangements in the magnetoresistive sensor can be used to improve uniformity, predictability, linearity, and/or reduce noise.

Domains formed in the nearby magnetic shield layers can also magnetically bias the magnetoresistor. Control of both domain magnetization direction and domain wall location in the shields are important for the proper operation of the magnetoresistive transducer because of magnetic interaction between the magnetoresistor and the shield.

Some shield designs control the location of domain walls by control of the shield shape. Other shield designs control the polarity of magnetic domains by removing all domain walls and forcing the shield into a single domain state. A side effect of these single domain state designs is that, without closure domains, magnetic charge forms at the edge of the shield that can cause track erasure and loss of data.

A magnetic read/write transducer and a method of making such a magnetic read/write transducer are needed in which magnetic biasing is provided to a shield that reduces track erasures, that provides a low noise, high linearity output, and that is easily manufactured.

SUMMARY OF THE INVENTION

Disclosed is a read/write head that comprises a bottom shield and a shared shield. The shared shield includes a first domain and a plurality of closure domains. The read/write head also includes a magnetoresistive sensor deposited adjacent an air bearing surface between the bottom shield and the shared shield. The magnetoresistive sensor includes a magnetoresistor aligned with the first domain. Non-magnetic material separates the magnetoresistive sensor from the bottom shield and the shared shield. The shared shield includes a shaped feature that defines an unambiguous direction of magnetization for the first domain.

These and various other features as well as advantages that characterize the present invention will be apparent upon reading of the following detailed description and review of the associated drawings.

BRIEF DESCRIPTION OF THE DRAWINGS

FIG. 3 illustrates an enlarged partial cross sectional view of the head illustrated in FIG. 2 and a magnetic layer of a disc.

FIG. 4 illustrates PRIOR ART arrangements of a magnetoresistive sensor between shield layers.

FIG. 5 illustrates a PRIOR ART process of magnetizing shields with generally rectangular shapes.

FIG. 6 illustrates a process of magnetizing shields that are shaped to control domain wall formation.

DETAILED DESCRIPTION OF ILLUSTRATIVE EMBODIMENTS

In the embodiments described below, a shared shield in a read/write head has a shaped feature that defines an unambiguous direction of magnetization for a domain in the shared shield. The shaped feature can include singly or in any combination a trapezoidal shape shared shield with or without rounded corners, or a rectangular shaped shield with shaped features in the form of one or more ferromagnetic or antiferromagnetic deposits on the shield that are shaped like an underlying domain in the magnetically soft rectangular shield. With the illustrated embodiments, problems with ambiguity in the location and direction of magnetization in the shield are avoided, and the performance of a magnetoresistive read sensor aligned with the shield is improved. In the illustrated embodiments, the shaped features control both the location and direction of magnetization of a domain in the shield that is aligned with a read sensor. The stray field at the read sensor that is caused by the shield domain is predictably controlled by an externally applied magnetic field during manufacture of the head.

Figure 1:
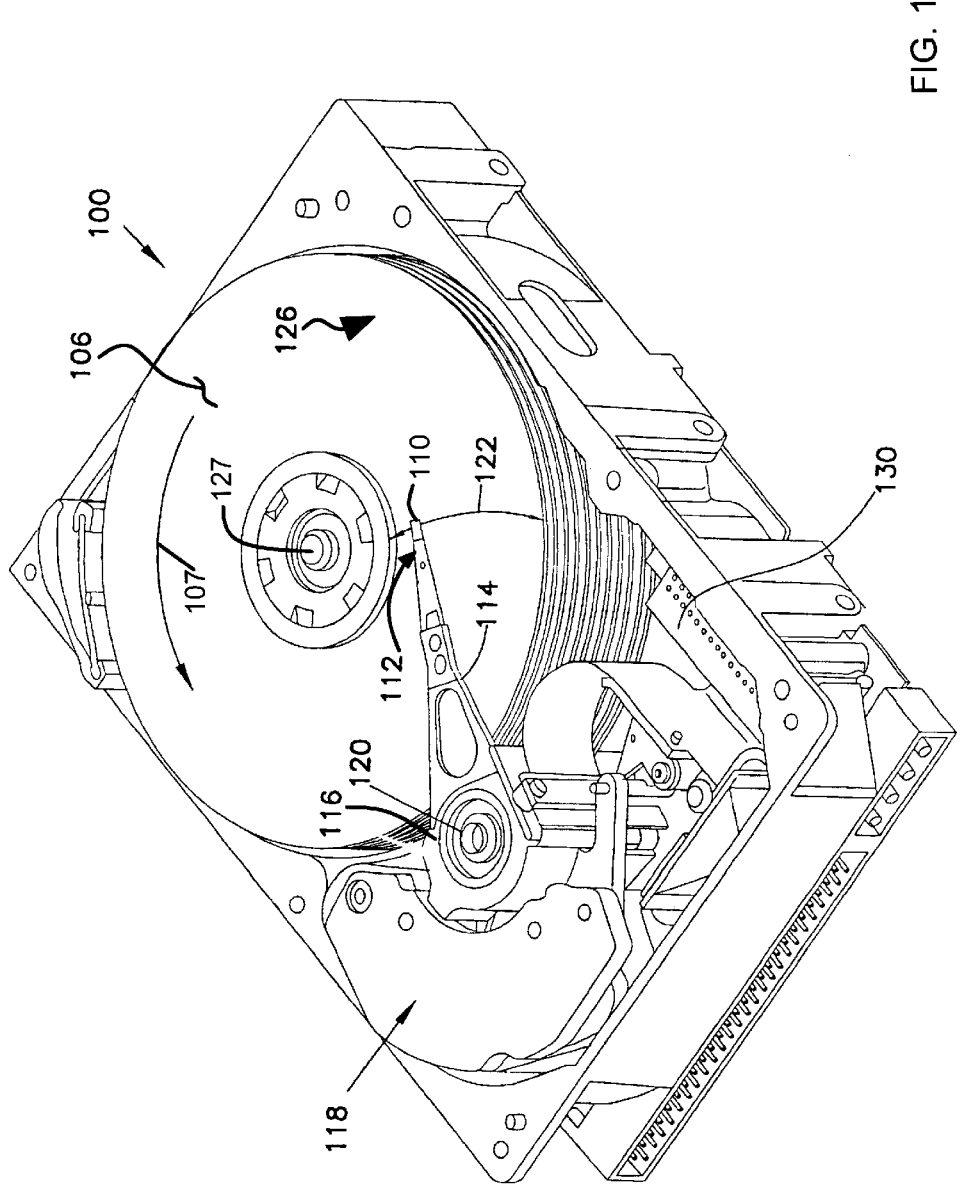
FIG. 1 illustrates a disc drive storage device.

FIG. 1 illustrates an embodiment of a disc drive storage device 100. Disc drive 100 includes a disc pack 126 having storage surfaces 106 that are illustratively layers of material (such as magnetic material or optically readable material). The disc pack 126 includes a stack of multiple discs each accessible by a read/write assembly 112 that includes a slider 110 that includes a read/write head. A spindle motor 127 drives rotation of the discs in disc pack 126 in a direction such as that shown by arrow 107. As discs are rotated, read/write assembly 112 accesses different rotational locations on the storage surfaces 106 in disc pack 126. Read/write assembly 112 is actuated for radial movement relative to the disc surfaces 106, such as in a direction indicated by arrow 122, in order to access different tracks (or radial positions) on the disc surfaces 106. Such actuation of read/write assembly 112 is illustratively provided by a servo system that includes a voice coil motor (VCM) 118. Voice coil motor 118 includes a rotor 116 that pivots on axis 120. VCM 118 also illustratively includes an arm 114 that supports the read/write head assembly 112.

Disc drive 100 illustratively includes control circuitry 130 for controlling operation of disc drive 100 and for transferring data in and out of the disc drive 100.

Figure 2:
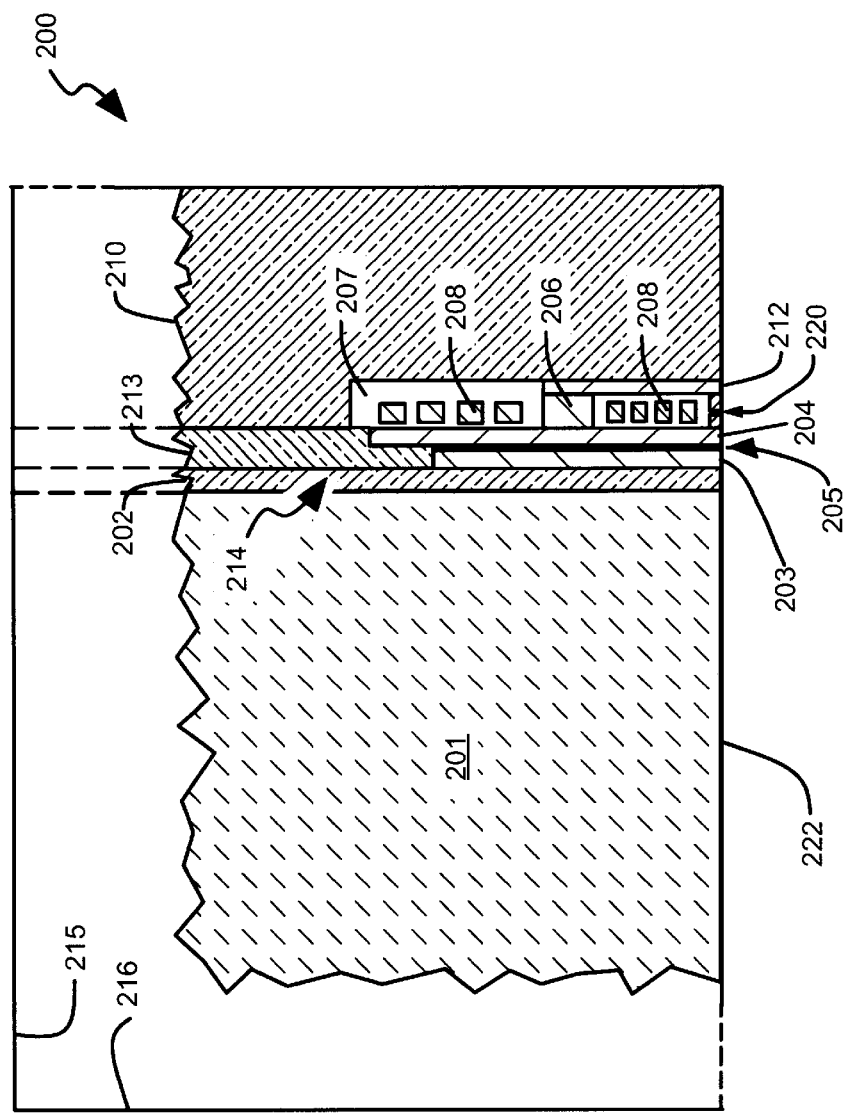
FIG. 2 illustrates a partial cross sectional view of a slider that includes a thin film head.

FIG. 2 schematically illustrates a partial cross-section of a slider 200 for a disc drive. Slider 200 includes a thin film read/write head or transducer 214. The transducer 214 is deposited on a substrate 201. A large part of the slider 200 is built from a substrate 201 that extends to edges 215 and 216 as illustrated. The portion of slider 200 that is illustrated in cross-section in FIG. 2 is near the trailing edge of the slider 200 along a central plane perpendicular to an air bearing surface 222 of the slider 200.

The substrate 201 is preferably formed from an electrically conducting ceramic material, such as a mixture of aluminum oxide ($Al_2O_3$) and titanium carbide (TiC), sometimes referred as "AlTiC". Silicon dioxide and other known substrate materials can also be used.

A basecoat material 202 is deposited on the top of substrate 201. The basecoat material 202 is an electrically insulating material, typically $Al_2O_3$. The basecoat material 202 forms a bond to the substrate material 201. Silicon dioxide and other known basecoat materials can also be used.

Deposited metallic magnetic layers from alloys of iron (Fe), nickel (Ni), or cobalt (Co) form a bottom shield 203, shared shield 204, top pole 212 and a core 206. Core 206 completes a write magnetic circuit through the center of a coil 208 and through a write gap 220 at the air bearing surface 222.

The write coil 208 in the transducer 214 is preferably made from copper or from another highly electrically conducting metal or alloy. A coil insulator 207 is typically formed from a cured photoresist. Silicon dioxide and other known coil insulators can also be used.

An additional deposited electrically insulating layer 213 fills the space around bottom shield 203, and shared shield 204. A portion of layer 213 (not illustrated in FIG. 2) may also extend between the bottom shield 203 and the shared shield 204 to provide a nonmagnetic, electrically insulating layers around a magnetoresistive read sensor 205. Layer 213 is typically made from $Al_2O_3$ and forms a bond to the basecoat layer 202.

In the case of some alternative read sensors, however, electric current flows transverse to the read sensor and the bottom and shared shields are used as current carrying conductors for the read sensor current. With these alternative read sensors, nonmagnetic metallic layers are used between the read sensor and the shields.

For clarity, electrical leads and contacts, formed from Cu, Au, or other metals or metallic alloys in a conventional manner are not illustrated in FIG. 2.

One or more insulating overcoat or topcoat layers 210 are deposited on the top of all the transducer 214. Overcoat layer 210 is typically also made from $Al_2O_3$ or other known dielectrics. Overcoat layer 210 is preferably planarized after deposition to expose electrical contacts (not illustrated) for the coil 207 and the magnetoresistive read sensor 205 in the transducer 214.

After the slider 200 is formed as illustrated in FIG. 2, it is lapped to precisely shape the air bearing surface (ABS) 222 that flies over the magnetic media.

The read sensor 205 is formed in a very thin layer between lower shield 203 and shared pole 204. Read sensor 205 is typically a magnetoresistive (MR) or giant magnetoresistive (GMR) sensor, and comprises multiple layers. The read sensor 205 can be formed as illustrated in FIG. 3 for example.

FIG. 3 illustrates an enlarged partial cross sectional view of a head 223 similar to the head 214 illustrated in FIG. 2 and a magnetic layer 226 of a disc such as discs 126 illustrated in FIG. 1. In the head 223, a bottom shield 203 and a shared shield 204 are placed on each side of the read sensor 205 and provide magnetic shielding for the read sensor 205. A nonmagnetic layer or layers 224 magnetically isolate the read sensor 205 from the shields 203, 204.

Read sensor 205 senses external magnetic field components 230 emanating from a track in the magnetic layer 226 as the track moves past the head 223 at a constant speed. The magnetic field components 230 are present over each transition 228 in the magnetic layer 226. Each transition 228 is a line or wall along which the direction of the magnetization in magnetic layer 226 reverses or changes direction. Each magnetic field component 226 is sensed as it passes between the shielding layers 203, 204. The shielding layers 203, 204 shield the read sensor 205 from neighboring external magnetic field components 230. During operation of a disc drive, the head 223 remains spaced away from the magnetic layer 226 by a spacing 232. The spacing 232 includes an air bearing protective layer and any protective layer that is deposited over the magnetic layer 226.

Digitized information is stored on the magnetic layer 226 in the form of magnetic transitions 228. Each bit is represented by the presence (1) or absence (0) of a transition in the media. When transitions 230 are sensed, external electronic circuitry connected to the read sensor 205 interprets the transition 230 as one logical state (a one (1) for example), and interprets the absence of a transition 230 at a particular time as another logical state (a zero, for example). Read sensor 205 can be arranged with shields using many different arrangements and processes, some of which are illustrated below in FIGS. 4–5.

FIGS. 4–5 illustrate PRIOR ART arrangements and processes that provide magnetic bias to read sensors 205. FIG. 4 illustrates PRIOR ART heads 250 at 4(A) and 252 at 4(B). The illustrations in FIG. 4 are cross-sectional views that face an air bearing surface such as air bearing surface 222 in FIG. 2. The magnetoresistive sensors 205 each include a magnetoresistor 238 that abuts permanent magnet layers 240 and electrical contacts 242. Each magnetoresistive sensor 205 is subjected to a large magnetic field prior to use to set the direction of the permanent magnet layers 240 as indicated by arrows superimposed on the permanent magnet layers 240. Magnetic layers 240, which are part of the read sensors 205, are thus made into bias magnets that magnetically bias the magnetoresistor 238.

Magnetic shield layers 203, 204 are separated from the magnetoresistor 238 by insulating layers 224. A non-planar shape of the magnetic shield layer 204 is the result of process and design constraints, and results in magnetic charge or poles (shown as "+" or "−") that interacts with the magnetoresistors 238. The sign or direction of the magnetic charge is to the right in head 250, but the direction of the magnetic charge is to the left in head 252. The direction of magnetic charge depends on the polarity or state of the nearest domain, indicated by arrows 246, 248. The domain state in FIG. 4(A) is in the same direction as the magnetization of magnetic layer 240 and is referred to as a "normal" domain state. The domain state in FIG. 4(B) is opposite the direction of magnetization of magnetic layer 240 and is referred to as a "reverse" domain state.

FIG. 5 illustrates a PRIOR ART process of magnetizing heads 250, 252 that include shields 204 with conventional rectangular shapes. In FIG. 5, shields 204 and read sensors 205 including magnetoresistor 238 are illustrated in plan view during successive processing times 5(A), 5(B), 5(C) and 5(D). For clarity, only the magnetoresistors 238 and shields 204 are illustrated at process points 5(B), 5(C) and 5(D). At process stage 5(A), a magnetic field 260 is applied to both the shields 204 and the read sensors 205. A setting process for the permanent magnets comprises subjecting the magnetoresistors 205 to a large magnetic field as indicated by an arrow 260. During the setting procedure, the shields 204 are saturated in a single magnetic domain at process stage 5(A). As the field strength is reduced at process stage 5(B) as indicated by an arrow 262, closure domains 266, 268 nucleate in the corners of the shields 204. With a conventional symmetric rectangular shield 204, closure domains are equally likely to nucleate in the upper corners or lower corners. With other more complex domain structures, nucleation can occur in other locations, as well. The nucleation sites determine the domain state as the field is further reduced at process stage 5(C) as indicated by arrow 264. When the externally applied field is removed altogether at process stage 5(D), the domain state is either "normal" or "reversed" depending on the random location of the nucleation. In FIG. 5, the shield of head 250 has a domain adjacent magnetoresistor 238 that is magnetized in a rightward (normal) direction as indicated by arrow 246. The shield 204 of head 252, however, has a domain adjacent magnetoresistor 238 that is magnetized leftward (reversed) as illustrate by arrow 248.

Abutted junction heads employing permanent magnets for sensor stabilization are thus subjected to the magnet setting procedure illustrated in FIG. 5. The purpose of the procedure is to set the magnetization direction of the permanent magnets 240 (FIG. 4). This procedure has the side effect of saturating the shields as illustrated at 5(A). As the field strength is reduced as illustrated in FIG. 5, domain walls nucleate in the shields, as shown in FIG. 5(B). The polarities of these initial closure domains determine the final domain state of the shield when the field is removed.

The shield states are referred to as "normal" or "reverse," depending whether the shield domain nearest the magnetoresistor is parallel to the permanent magnets in the sensor or antiparallel. Head performance may vary undesirably depending whether the domain state is "normal" or "reverse." This unpredictability makes it more difficult to design electronic circuitry for the read operation and increases the likelihood of error in read operations.

With most shield designs, the domain state is determined randomly with equal probability of either state occurring. The domain nearest the reader results in magnetic charge, which can affect reader performance. As shown in FIG. 4, the magnetic charge is present because of topography due to the shape of the underlying read sensor 205. The sign of the magnetic charge depends on the polarity of the adjacent domain.

By using a shield with a shaped feature as illustrated below, however, the polarity of the domain in the shield that is aligned with the magnetoresistor can be controlled. Correction for the problems illustrated in FIGS. 4–5 using shaped features in the shield is shown below in examples illustrated in FIGS. 6–9 below.

The simple domain pattern shown in FIG. 5, and more complex domain patterns are also know to be found in rectangular shields.

FIG. 6 illustrates a process of magnetizing shared shields 300, 302 that are part of a read/write head such as head 214 in FIG. 2. Each example of a shared shield 300, 302 comprises a layer 301, 303 of magnetically soft material. Layers 301, 302 do not have conventional rectangular shapes, but instead have trapezoidal shapes with some acute angled corners and some obtuse angled corners. Each layer 301, 303 has multiple shape features that are selected to control domain wall formation and provide an unambiguous direction of magnetization for a first domain 320, 330 that is aligned with a magnetoresistor 308, 310 as illustrated.

The shared shields 300, 302 are subjected to an externally generated magnetic field during manufacture. As illustrated by arrow 312, a large magnetic field is applied to both shared shields 300, 302 initially at process point 6(A). The magnetic field is then reduces over time as illustrated by successively shorter arrows 314, 316 at process points 6(B) and 6(C) until the external magnetic field is shut off at the last process point 6(D).

The shared shields 300 include shape features that control domain wall formation and define an unambiguous direction of magnetization in a first domain 320 that is aligned with the magnetoresistor 308. As externally applied field is reduced, domain walls tend to form first at corners 322, which have acute angles. These acute angles are shape features that favor domain wall nucleation relative to obtusely angled corners of the trapezoid. Another shape feature of corners 322 is the well-defined sharp point at corners 322. Corners 324, on the other hand, have shape features that inhibit domain wall formation. One shape feature of corners 324 is the obtuse angle of corners 324 that inhibits domain wall formation. Another shape feature of corners 324 is a rounded edge, which also inhibits domain wall formation. When shared shield 300 is processed as shown in FIG. 6, the magnetization of first domain 320 is unambiguously to the right, as illustrated. Addition domains 321, 323, 325 in shared shield 300 form closure domains.

The shared shield 302 include shape features that control domain wall formation and define an unambiguous direction of magnetization in a first domain 330 that is aligned with the magnetoresistor 310. As externally applied field is reduced, domain walls tend to form first at corners 332. Corners 332 have shape features that favor domain wall nucleation. One shape feature of corners 332 is the acute angle of corners 332. Another shape feature of corners 332 is the well-defined sharp point at corners 322. Corners 334 have shape features that inhibit domain wall formation. One shape feature of corners 334 is the obtuse angle of corners 334. Another shape feature of corners 334 is a rounded edge as illustrated. When shared shield 302 is processed as shown in FIG. 6, the magnetization of first domain 330 is unambiguously to the right, as illustrated. Addition domains 331, 333, 335 in shared shield 302 form closure domains.

It is thus possible, as illustrated in FIG. 6 to form a shield that has shape features around the outer edges of a soft magnetic shield layer that unambiguously define a direction of magnetization for a domain that is aligned with a magnetoresistor. The direction of the field is predictable and can be controlled by the direction of the externally applied field during manufacture.

In FIG. 6, a shaped feature in the shared shields 300, 302 comprises a generally trapezoidal shape with generally acute angled corners along a first axis generally parallel to the air bearing surface 222, and with generally obtuse angled corners along a second axis generally parallel to the air bearing surface 222. Another shaped feature in the shared shields comprises rounded corners along a first axis generally parallel with the air bearing surface, and sharp corners along a second axis generally parallel to the air bearing surface. Various shaped features shown in FIG. 6, as well as other shaped features shown below, can used singly or in various combinations depending on the needs of the application to define an unambiguous direction of magnetization for the first domain 320 or 330. Other examples of shaped features of shared shields are described below in connection with FIGS. 7–9.

Figure 7:
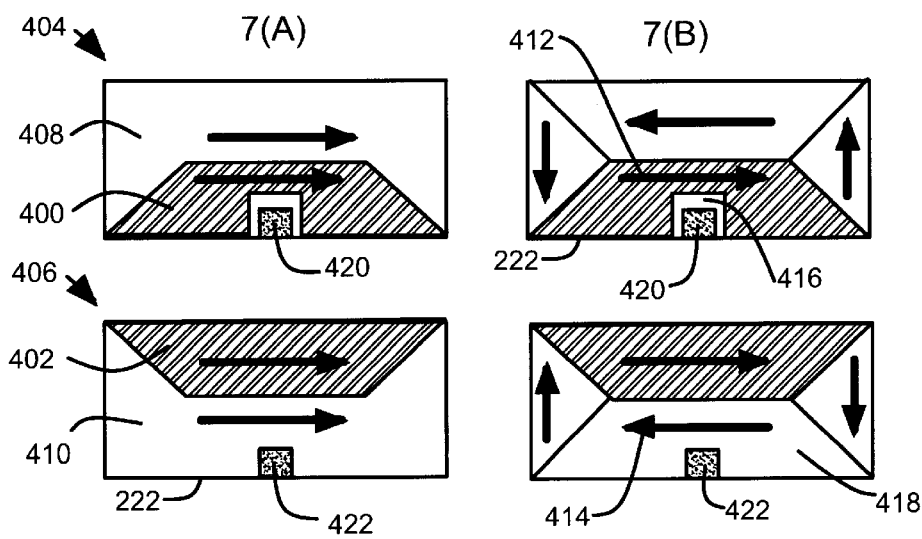
FIG. 7 illustrates arrangements of shaped permanent magnets on shields with rectangular shapes.

FIG. 7 illustrates two alternative arrangements of shared shields 404, 406 that comprise shaped permanent magnet layers 400, 402 deposited on magnetically soft layers 408, 410 that have generally rectangular shapes as illustrated. The shields 404, 406 thus have a multilayer structure. Each permanent magnet layer 400, 402 comprises a shaped feature that defines an unambiguous direction of magnetization 412, 414 in a first domain 416, 418 of each shield after an externally applied magnetic field is reduced from process point 7(A) to process point 7(B). The first domains 416, 418 are aligned with a magnetoresistor 420, 422 as illustrated. In the case of shared shield 404, the permanent magnet layer 400 is cut away around the magnetoresistor 420. The cut-away of permanent magnet layer 400 prevents the permanent magnet layer 400 from excessively biasing the magnetoresistor 420, while still allowing the permanent magnet layer 400 to define the location and direction of the first domain 416. Closure domains are formed in each shared shield 404, 406 around each first domain 416, 418 as illustrated. Permanent magnet layers 400, 402 cover substantially all of a domain in the corresponding shared shield 404, 406 and have substantially the same shape as the underlying domain.

Figure 8:
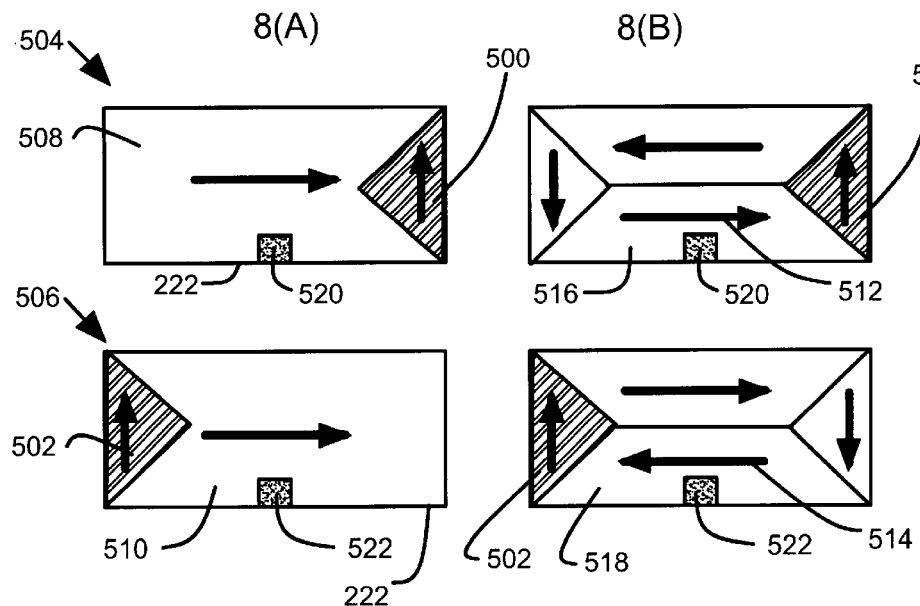
FIG. 8 illustrates arrangements of shaped antiferromagnetic pinning layers on shields with rectangular shapes.

FIG. 8 illustrates two alternative arrangements of shared shields 504, 506 that comprise antiferromagnetic pinning layers 500, 502 deposited on magnetically soft shield layers 508, 510 that have generally rectangular shapes as illustrated. Each antiferromagnetic pinning layer 500, 502 comprises a shaped feature that defines an unambiguous direction of magnetization 512, 514 in a first domain 516, 518 of each shield after an externally applied magnetic field is reduced from process point 8(A) to process point 8(B). The first domains 516, 518 are aligned with a magnetoresistor 520, 522 as illustrated. In the case of shared shield 504, the antiferromagnetic layer 500 is spaced away from the magnetoresistor 520. The spacing of antiferromagnetic layer 500 from magnetoresistor 520 prevents the antiferromagnetic layer 400 from excessively biasing the magnetoresistor 520, while still allowing the antiferromagnetic layer 400 to define a location and direction of a closure domain. Closure domains are formed in each shared shield 504, 506 around each first domain 516, 518 as illustrated. Antiferromagnetic layers 500, 502 cover substantially all of a closure domain in the corresponding shared shield 504, 506 and have substantially the same shape as the underlying closure domain.

A pinning direction of the antiferromagnetic layers 500, 502 is preferably set by a thermal anneal in a magnetic field. By patterning the pinning layer so it coincides with a closure domain in the shield, the magnetic field during anneal is perpendicular to an air bearing surface 222. This orientation is compatible with an anneal for a magnetoresistive sensor that comprises a spin valve sensor. The final direction of magnetization of the domain aligned with the magnetoresistive sensor 520, 522 is not determined by the direction of the permanent magnet setting field. Instead, the final direction of the domain is determined by the magnetic anneal.

The pinning direction is set by a high temperature anneal in a magnetic field, in the same direction as the pinned layer within the spin valve sensor. The shield is saturated during the setting process 8(A). When the field is removed, the pinning layer determines the domain state at 8(B).

Figure 9:
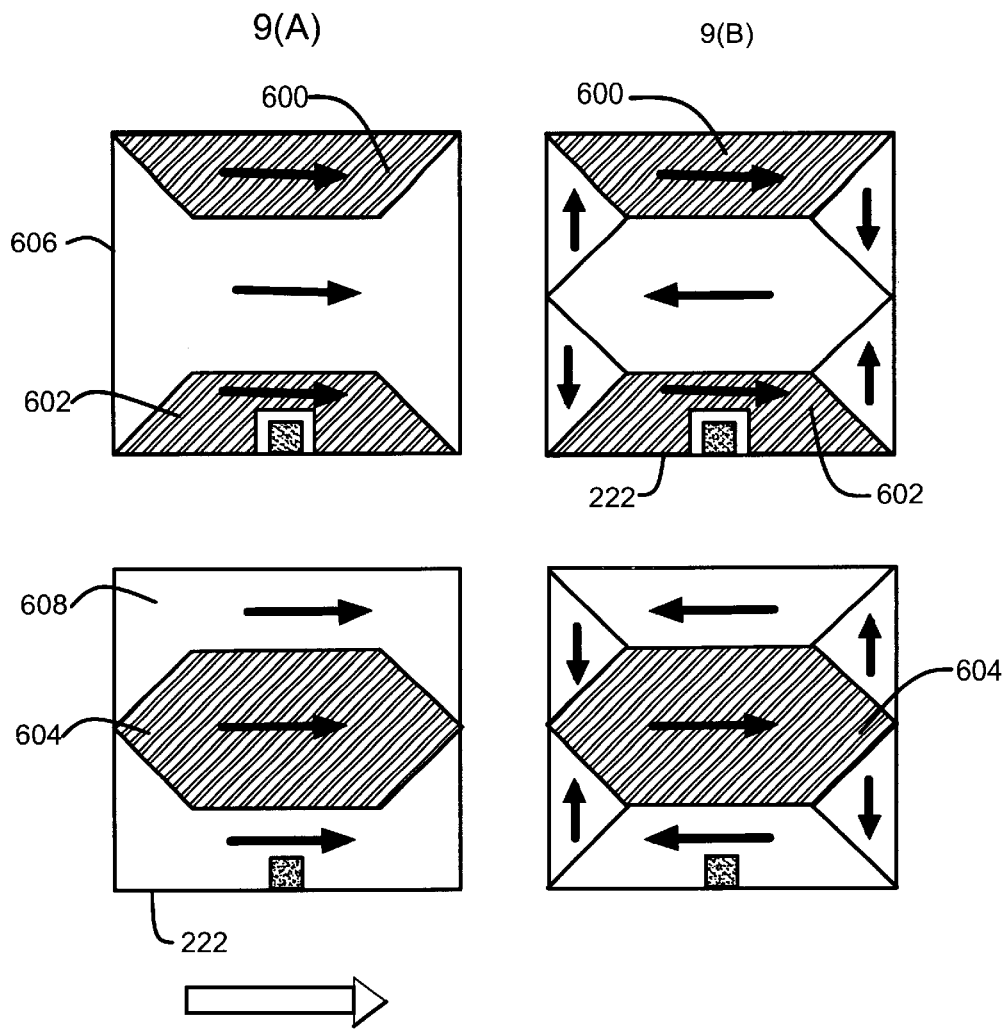
FIG. 9 illustrates arrangements of shaped permanent magnet pinning layers on shields with multiple closure domains.

FIG. 9 illustrates arrangements of permanent magnet pinning layers 600, 602, 604 on rectangular shared shields 606, 608 with complex multiple closure domains, e.g., seven (7) domains formed in each shared shield 606, 608.

In summary, a read/write head (110, 214) comprises a bottom shield (203) and a shared shield (204, 300, 302, 404, 406, 504, 506). The shared shield includes a first domain (320, 330, 416, 418) and a plurality of closure domains (321, 323, 325, 331, 333, 335). The read/write head also includes a magnetoresistive sensor (205) deposited adjacent an air bearing surface (222) between the bottom shield and the shared shield. The magnetoresistive sensor includes a magnetoresistor (308, 310, 420, 422, 520, 522) aligned with the first domain. Nonmagnetic material (224) separates the magnetoresistive sensor from the bottom shield and the shared shield. The shared shield includes a shaped feature (400, 402, 500, 502, 600, 602, 604) that defines an unambiguous direction of magnetization for the first domain.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the read/write while maintaining substantially the same functionality without departing from the scope and spirit of the present invention. For example, the read sensor may be of a type that has current flowing through it in a direction that is transverse to the bottom and shared shields, with the bottom and shared shields serving as current carrying conductors for the magnetoresistor current. In addition, although the preferred embodiment described herein is directed to a thin film head for a hard disc drive system, it will be appreciated by those skilled in the art that the teachings of the present invention can be applied to other magnetic systems, like tape drives, without departing from the scope and spirit of the present invention.

What is claimed is:

1. A read/write head, comprising:
    a bottom shield and a shared shield, the shared shield including a first domain and a plurality of closure domains;
    a magnetoresistive sensor deposited adjacent an air bearing surface between the bottom shield and the shared shield; and
    the shared shield having a trapezoidal perimeter, the perimeter including a first longer side with acute angled corners and an opposite second shorter side with obtuse angled corners, the shape of the perimeter defining an unambiguous direction of magnetization for the first domain.

2. The read/write head of claim 1 wherein the first longer side and the opposite second shorter side are both generally parallel to the air bearing surface.

3. The read/write head of claim 1 wherein the obtuse angled corners comprise rounded corners.

4. The read/write head of claim 1 wherein the magnetoresistive sensor includes a magnetoresistor aligned with the first domain.

5. The read/write head of claim 4 further comprising nonmagnetic material separating the magnetoresistive sensor from the bottom shield and the shared shield.

6. A read/write head, comprising:

a magnetoresistive sensor with a shared shield including a first domain and an air bearing surface; and means for defining a direction of magnetization for the first domain, the means for defining including a trapezoidal perimeter of the shared shield, the perimeter including a first longer side with acute angled corners and an opposite second shorter side with obtuse angled corners, the shape of the perimeter defining an unambiguous direction of magnetization for the first domain.

7. The read/write head of claim 6 wherein the first longer side and the opposite second shorter side are both generally parallel to the air bearing surface.

8. The read/write head of claim 6 wherein the obtuse angled corners comprise rounded corners.

9. A method of manufacturing a read/write head, comprising:

providing a bottom shield and providing a shared shield including a first domain and a plurality of closure domains;

providing a magnetoresistive sensor deposited adjacent an air bearing surface between the bottom shield and the shared shield; and providing the shared shield with a trapezoidal perimeter, the perimeter including a first longer side with acute angled corners and an opposite second shorter side with obtuse angled corners, the shape of the perimeter defining an unambiguous direction of magnetization for the first domain.

10. The method of claim 9, further comprising biasing the magnetoresistive sensor with a bias magnet that magnetizes the magnetoresistor in the same direction as the first domain.

11. The method of claim 9, further comprising controlling nucleation of domain walls in the shared shield.

12. The method of claim 9, further comprising: positioning the first longer side and the opposite second shorter side generally parallel to the air bearing surface.

13. The method of claim 9, further comprising providing the shaped feature as an antiferromagnetic sublayer of material in the shared shield, the antiferromagnetic sublayer overlying substantially all of a domain of the shared shield.

14. The method of claim 9 further comprising a ferromagnetic sublayer of material in the shared shield, the ferromagnetic sublayer covering substantially all of a domain in the shared shield.

15. The method of claim 14 wherein the ferromagnetic layer overlies the first domain and is cut away overlying the magnetoresistor.

16. The method of claim 9 wherein the magnetoresistive sensor includes a magnetoresistor aligned with the first domain.

17. The method of claim 16 further comprising:

electrically insulating the magnetoresistive sensor from the bottom shield and the shared shield.

* * * * *